(12) United States Patent
Reynolds et al.

(10) Patent No.: US 7,826,674 B1
(45) Date of Patent: Nov. 2, 2010

(54) CONTENT SIGNAL ANALYSIS

(75) Inventors: Michael C. Reynolds, Ballwin, MO (US); Jesse J. Chounard, II, Ballwin, MO (US); Christopher E. Chupp, St. Louis, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 1455 days.

(21) Appl. No.: 11/221,428

(22) Filed: Sep. 8, 2005

Related U.S. Application Data

(60) Provisional application No. 60/608,738, filed on Sep. 10, 2004.

(51) Int. Cl.
*G06K 9/36* (2006.01)
*H04N 7/12* (2006.01)
*G06K 9/46* (2006.01)

(52) U.S. Cl. .................. 382/239; 375/240.26
(58) Field of Classification Search ........ 382/173, 382/232, 233, 235, 239; 375/240.01, 240.08, 375/240.25, 240.26; 348/143, 207.1, 460, 348/463, 465, 473, 486, 700, 701, E5.024, 348/E7.091

See application file for complete search history.

(56) References Cited

U.S. PATENT DOCUMENTS

| | | | |
|---|---|---|---|
| 4,653,109 A | 3/1987 | Lemelson et al. | |
| 4,807,031 A | 2/1989 | Broughton et al. | |
| 5,333,091 A | 7/1994 | Iggulden et al. | |
| 5,548,323 A * | 8/1996 | Callahan | 725/33 |
| 5,594,493 A | 1/1997 | Nemirofsky | |
| 5,692,093 A | 11/1997 | Iggulden et al. | |
| 5,696,866 A | 12/1997 | Iggulden et al. | |
| 5,767,896 A | 6/1998 | Nemirofsky | |
| 5,880,769 A | 3/1999 | Nemirofsky et al. | |
| 5,907,350 A | 5/1999 | Nemirofsky | |
| 5,953,047 A | 9/1999 | Nemirofsky | |
| 5,987,210 A | 11/1999 | Iggulden et al. | |
| 5,999,688 A | 12/1999 | Iggulden et al. | |
| 6,094,228 A | 7/2000 | Ciardullo et al. | |
| 6,229,572 B1 | 5/2001 | Ciardullo et al. | |
| 6,240,555 B1 | 5/2001 | Shoff et al. | |
| 6,347,114 B1 | 2/2002 | Blanchard | |
| 6,661,905 B1 | 12/2003 | Chupp et al. | |
| 7,212,570 B2 * | 5/2007 | Akiyama et al. | 375/240.01 |
| 7,337,462 B2 * | 2/2008 | Dudkiewicz et al. | 725/136 |
| 7,555,046 B2 * | 6/2009 | Zoghlami et al. | 375/240.26 |
| 2001/0016943 A1 | 8/2001 | Maas et al. | |
| 2001/0024239 A1 * | 9/2001 | Feder et al. | 348/423.1 |
| 2001/0026591 A1 * | 10/2001 | Keren et al. | 375/240.26 |
| 2002/0112250 A1 | 8/2002 | Koplar et al. | |
| 2002/0183102 A1 | 12/2002 | Withers et al. | |
| 2004/0117856 A1 | 6/2004 | Barsoum et al. | |
| 2004/0227854 A1 | 11/2004 | Withers et al. | |
| 2005/0047595 A1 | 3/2005 | Chupp et al. | |
| 2005/0055156 A1 | 3/2005 | Maltagliati et al. | |
| 2005/0083436 A1 | 4/2005 | Reynolds et al. | |
| 2010/0091113 A1 * | 4/2010 | Morioka et al. | 348/207.1 |

* cited by examiner

*Primary Examiner*—Amir Alavi
(74) *Attorney, Agent, or Firm*—Polsinelli Shughart PC

(57) ABSTRACT

A method for modulating a content signal (18) to contain an auxiliary signal, the content signal (18) having content segments, the method comprising logging detections of a test content signal (20) to create one or more log files (44); parsing the one or more log files (44) to create a profile file (46); scheduling the profile file (46) to create an encode file (48); and encoding the content signal (18) with the auxiliary signal according to the encode file (48) and a modulation method.

19 Claims, 16 Drawing Sheets

OVERVIEW OF AN ANALYSIS SYSTEM

CONFIGURATION OF
TESTING DETECTORS

TESTING DETECTOR

COMPUTER SYSTEM  FIG. 5

ANALYSIS SOFTWARE

PROFILE FILE OF A FIRST POSITON   FIG. 11A
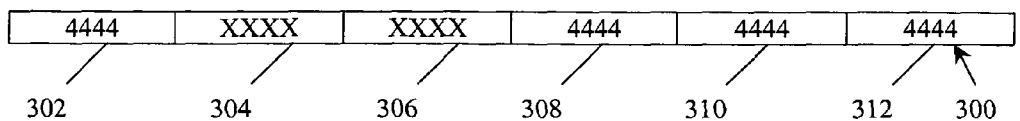
PROFILE FILE OF A SECOND POSITON   FIG. 11B
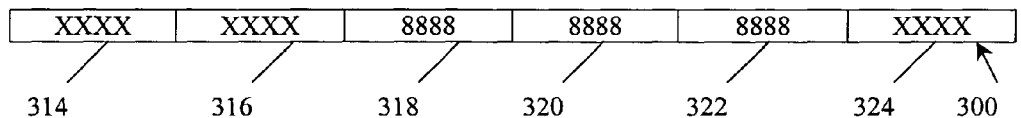
PROFILE FILE OF A FIRST AND A SECOND POSITON   FIG. 11C
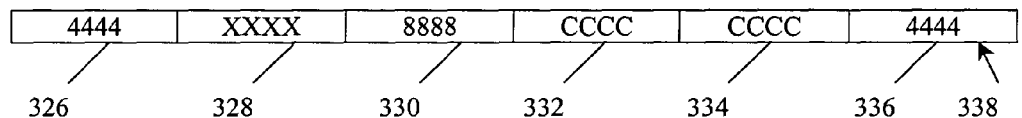

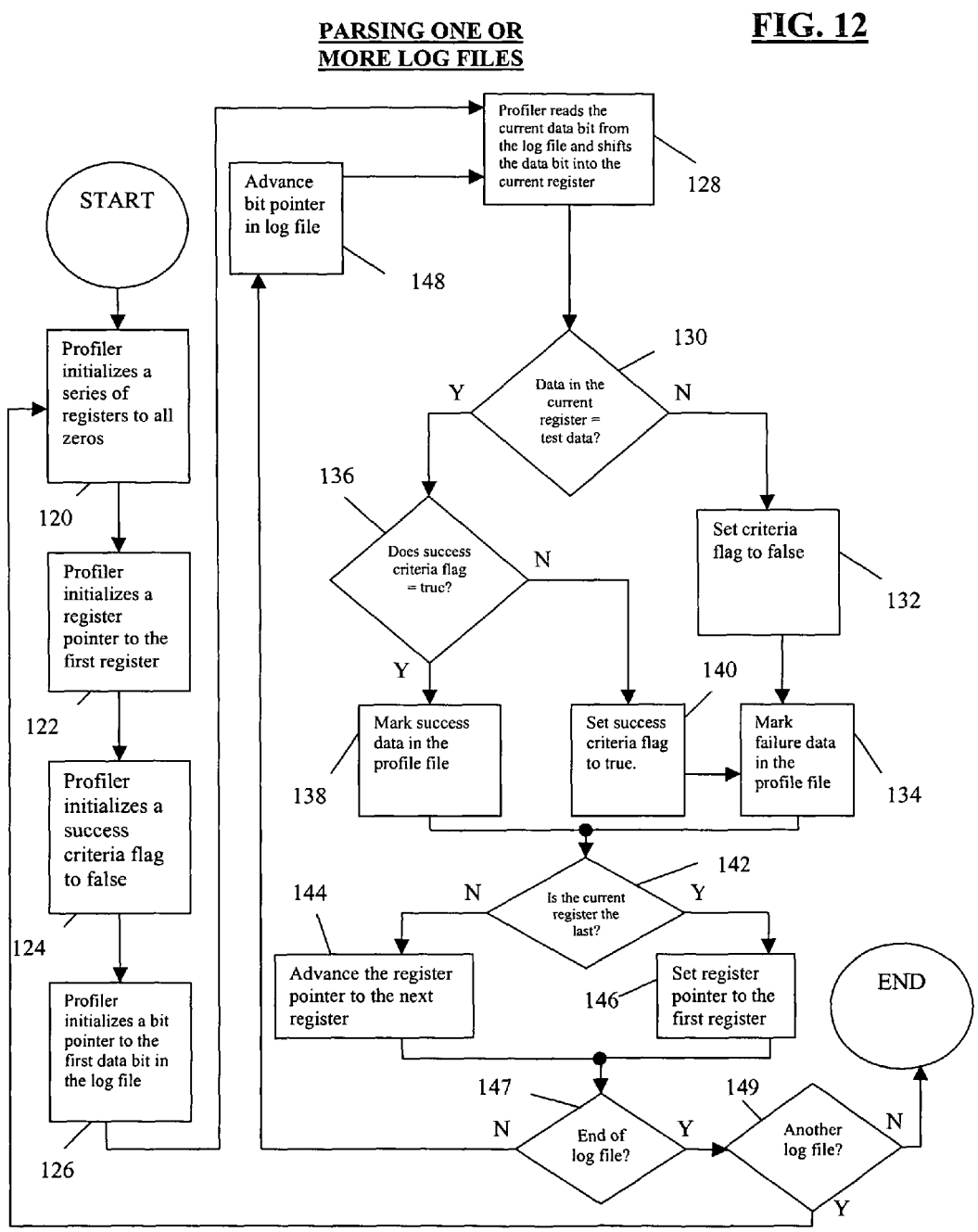
FIG. 12 PARSING ONE OR MORE LOG FILES

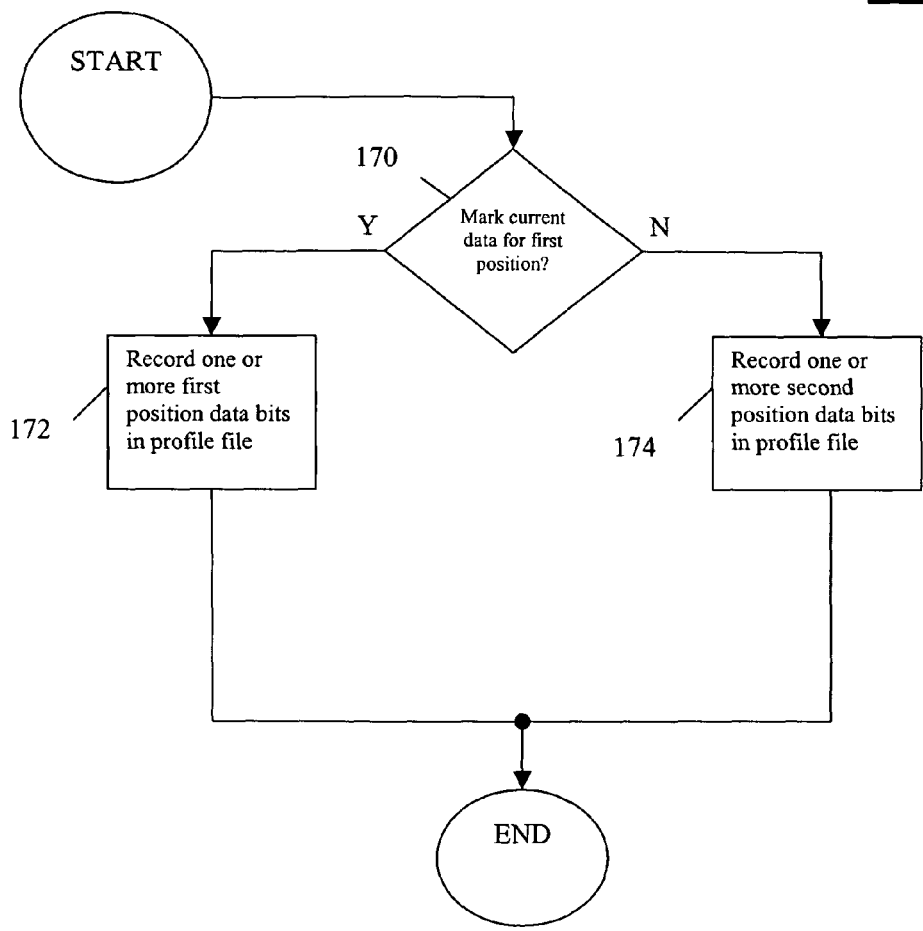

CONTENT SIGNAL ANALYSIS

CROSS-REFERENCE TO RELATED APPLICATION

This application claims the benefit of United States Provisional Patent Application entitled "Method and System for Profiling and Scheduling Auxiliary Signals", Ser. No. 60/608,738, filed 10 Sep. 2004 by Michael C. Reynolds, Jesse J. Chounard II and Christopher E. Chupp.

SUMMARY

In one aspect, a content signal is modulated to contain an auxiliary signal. The content signal has content segments. Detections of a test content signal are logged to create one or more log files. One or more log files are parsed to create a profile file. The profile file is scheduled to create an encode file. The content signal is encoded with the auxiliary signal according to the encode file and a modulation method.

In another aspect, a signal is analyzed. The signal has signal segments. Detections of a test signal are logged to create one or more log files. One or more log files are parsed to create a profile file.

In another aspect, a content signal is modulated to contain an auxiliary signal. A profile file is selected to comprise marked profile sections with at least one of the marked profile sections having success data. The profile file is scheduled to create an encode file. The content signal is modulated with the auxiliary signal according to the encode file.

In another aspect, a content signal is analyzed by a system. A logger has means for logging detections of a test content signal to create one or more log files. A profiler has means for parsing the one or more log files to create a profile file.

In another aspect, a content signal is modulated by an apparatus. The apparatus has means for analyzing the content signal to identify portions of the content signal that if modulated to contain auxiliary data the auxiliary data should be detectable at one or more positions. The apparatus also has means for modulating at least one of the identified portions of the content signal to contain the auxiliary signal to create a modulated content signal.

Implementations may include one or more of the following features. Fields are selected as the content segments. Frames are selected as the content segments.

The content signal is modulated with test data to create a test content signal.

The content signal is received from a signal source. Operator instructions are received to modulate the content signal with the test data. The test content signal is provided to a broadcast source.

A testing detector is set in one or more positions. One or more detections are made at each of the content segments of the test content signal for each of the one or more positions. The one or more detections are stored in the one or more log files.

The one or more positions are one or more distances of the testing detector from a display device. The one or more positions are two or more different testing detectors. The one or more positions are two or more different modulation methods.

The test content signal is received on the testing detector directly from a broadcast source. An optical testing detector is selected as the testing detector. An inline testing detector is selected as the testing detector.

The test content signal is provided from a broadcast source to a display device. The test content signal is received on the testing detector from the display device.

One or more log files are opened to correspond with the one or more positions. One or more detections of the test data are identified as either a signal absence or a signal presence. The one or more positions are selected as a first distance and a second distance from the display device.

The signal absence is a data bit of zero and the signal presence is a data bit of one. The signal absence is complementary data bits "zero one" and the signal presence is complementary data bits "one zero".

The one or more detections are read at each of the content segments for each of the one or more log files. Success data is marked in a profile file for each of the content segments when a sufficient number of detections of the one or more detections of the content segments match the test data and otherwise failure data is indicated in the profile file for each of the one or more log files. Failure data is indicated as marking failure data.

The one or more detections are read at each of the content segments for each of the one or more log files. Success data is marked in one or more corresponding temp files for each of the content segments when a sufficient number of detections of the one or more detections of the content segments match the test data and otherwise failure data is indicated in the one or more corresponding temp files for each of the one or more log files. The one or more corresponding temp files are merged to create a profile file.

Two detections are selected as a sufficient number of detections. A first position and a second position are selected as the one or more positions.

An events list is provided comprising a listing of one or more events. Event data is obtained or completed for the one or more events on the events list. The event data of each of the one or more events on the events list is processed to determine placement information for each of the one or more events. The placement information is recorded in an encode file for the one or more events that were successfully placed into the content signal. Indicia of a successful placement of at least one of the one or more events that were successfully placed into the content signal is recorded in a success log. Indicia of an unsuccessful placement of zero or more of the one or more events that were not successfully placed into the content signal are recorded in a failure log. An encode file, a success log and a failure log are outputted.

The profile file is read to determine suitable content segments for modulating the content signal with the auxiliary signal at the one or more positions.

The profile file is read to determine unsuitable content segments for modulating the content signal with the auxiliary signal at the one or more positions.

One or more events and desired action time are identified for the one or more events. An event priority level and an acceptable range is obtained for each of the one or more events.

One or more events and desired action time are identified for the one or more events. An event priority level and an acceptable range are identified for each of the one or more events.

One or more events and desired action time are obtained for the one or more events. An event priority level and an acceptable range are obtained for each of the one or more events.

A configuration file with an event priority level and an acceptable range is provided for each of the one or more events.

The one or more events on the events list are processed based on priority level. The one or more events on the events list are processed from highest to lowest priority level.

Available content segments are determined prior to the desired time and within the acceptable range for the one or more events that are capable of being modulated according to the profile file.

A method of modulating a video portion of the content signal is selected as the modulation method. Luminance modulation is selected as the method of modulating a video portion of the content signal. Encoding in the vertical blanking interval (VBI) is selected as the method of modulating a video portion of the content signal.

A method of modulating an audio portion of the content signal is selected as the modulation method.

The content signal is a standard definition (SD) video signal. The content signal is a high definition (HD) video signal. The content signal is NTSC (National Television Standards Committee) video signal, PAL (Phase Alternation Line) video signal, SECAM (Systeme Electronique Couleur Avec Memoire) video signal, or sequence of bitmaps signal.

A scheduler having means for scheduling the profile file to create an encode file. An encoder having means for encoding the content signal with the auxiliary signal according to the encode file and a modulation method.

Means for logging detections of a test content signal to create one or more log files. Means for parsing the one or more log files to create a profile file. Means for scheduling the profile file to create an encode file.

BRIEF DESCRIPTION OF THE DRAWINGS

FIG. 11A is a block diagram of a profile file of a first position;

FIG. 11B is a block diagram of a profile file of a second position;

FIG. 11C is a block diagram of a profile file at a first position and a second position;

FIG. 12 is a flowchart of a method for parsing one or more log files;

FIG. 13 is a flowchart of a method for marking success data;

Corresponding reference characters indicate corresponding elements among the several views. The headings used in the figures should not be interpreted to limit the scope of the figures.

DETAILED DESCRIPTION

Figure 1:
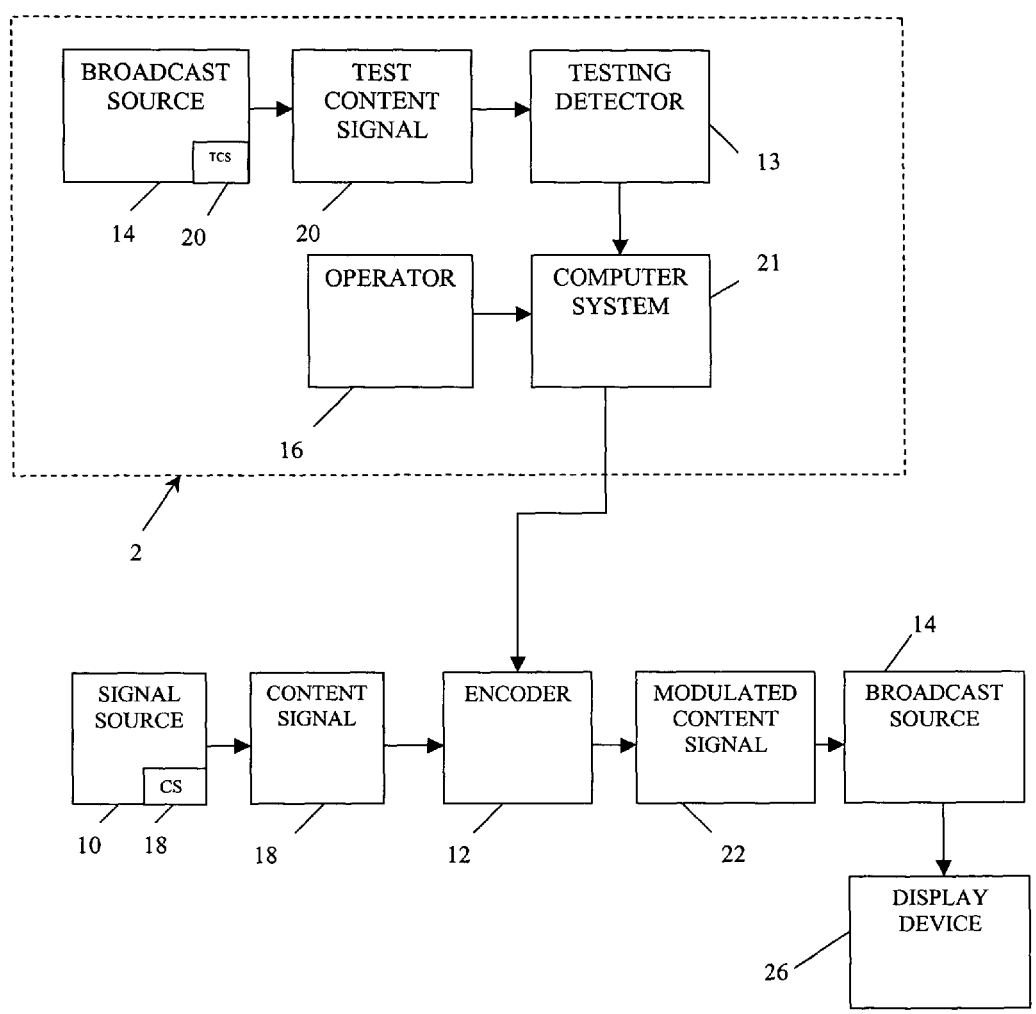
FIG. 1 is a block diagram of an overview of an analysis system.

Referring to FIG. 1, an implementation of an analysis system 2 is illustrated. In this implementation, a broadcast source 14 provides a test content signal 20 to a testing detector 13. Test content signal 20 includes content signal 18 modulated with an auxiliary signal, wherein the auxiliary signal represents test data. An implementation of a method for creating test content signal 20 is described in greater detail below.

Testing detector 13 is a device capable of detecting an auxiliary signal within test content signal 20 and a modulated content signal 22. An implementation of testing detector 13 is described in greater detail below. Testing detector 13 determines whether modulation of test data can be detected over certain segments of test content signal 20 and provides these detections to a computer system 21.

The operation of computer system 21 may be controlled by an operator 16. In one embodiment, operator 16 is a person that interacts with computer system 21 through an interface port. In another embodiment, operator 16 may consist entirely of computer hardware and/or software, or other electronic control device that directs operation of computer system 21 in an automated manner.

Computer system 21 processes the results of the detections received from testing detector 13 to determine how encoder 12 may be operated. Encoder 12 receives content signal 18 from a signal source 10, such that encoder 12 can modulate content signal 18 to contain the auxiliary signal.

In one embodiment, computer system 21 and encoder 12 may be integrated into the same hardware which may eliminate the need for several components.

Signal source 10 is a unit that is capable of transmitting and/or reproducing a sequence of images electrically in the form of content signal 18. Examples of signal sources 10 include a professional grade video tape player with a video tape, a camcorder, a video file server, a computer with an output port and a digital versatile disc (DVD) player with a DVD disc.

Content signal 18 is a sequence of images and optional associated audio that are in a compatible format. In various embodiments, content signal 18 may be standard definition (SD) or high definition (HD) content signals in NTSC, PAL (Phase Alternation Line), SECAM (Systeme Electronique Couleur Avec Memoire), sequence of bitmaps or other signal formats that transport a sequence of images. In one embodiment, content signal 18 may be any standard defined video format.

Upon modulating content signal 18, encoder 12 outputs a modulated content signal 22 including content signal 18 and the auxiliary signal. In one embodiment, an implementation of modulating content signal 18 is described in Broughton. However, other methods of modulating content signal 18 such as by video and/or audio modulation are also contemplated.

Modulated content signal 22 is provided to a broadcast source 14 for distribution and/or transmission to an end-user ("viewer") who will view the content associated with modulated content signal 22. Broadcast source 14 delivers content to one or more viewers in formats including analog or digital video by storage medium such as DVD, tapes, and other fixed medium or by transmission sources such as television broadcast stations, cable, satellite, wireless and Internet sources that broadcast or otherwise transmit content.

Display device 26 receives modulated content signal 22 from broadcast source 14. Display device 26 may be a device capable of presenting content signal 18 (and modulated content signal 22) to a viewer such as an analog or digital television, but may also include a device capable of recording content signal 18 such as a digital video recorder. Distribution of modulated content signal 22 to multiple display devices 26 by broadcast source 14 is contemplated.

Figure 2:
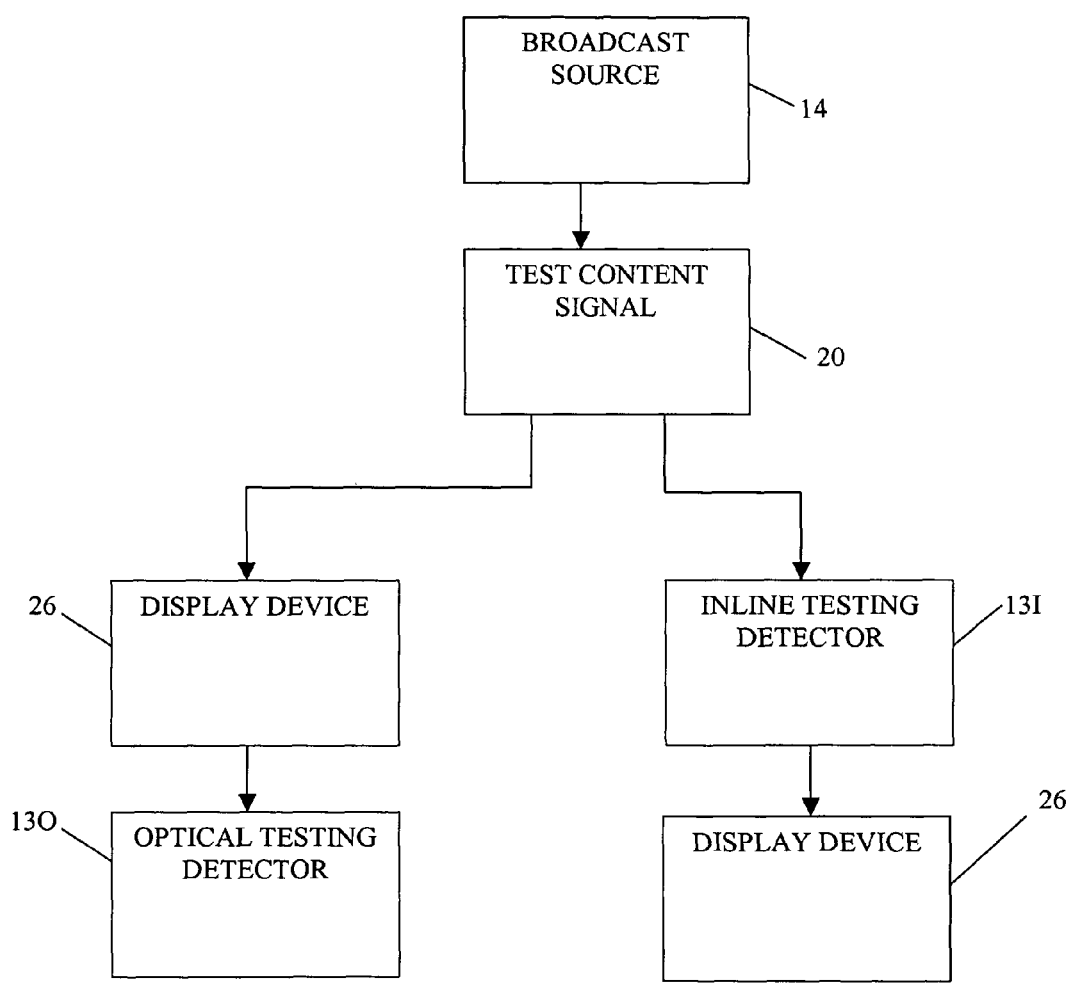
FIG. 2 is a block diagram of a configuration of testing detectors.

Referring to FIG. 2, an implementation of a configuration of testing detectors 13 is illustrated. In this implementation, broadcast source 14 provides test content signal 20 directly and indirectly to two testing detectors 13.

Upon receipt of test content signal 20 from broadcast source 14, display device 26 presents test content signal 20. An optical testing detector 130 optically detects test content signal 20 from display device 26.

An inline testing detector 131 electrically receives test content signal 20 from broadcast source 14. Inline testing detector 131 processes test content signal 20 and passes test content signal 20 for presentation on display device 26.

Figure 3:
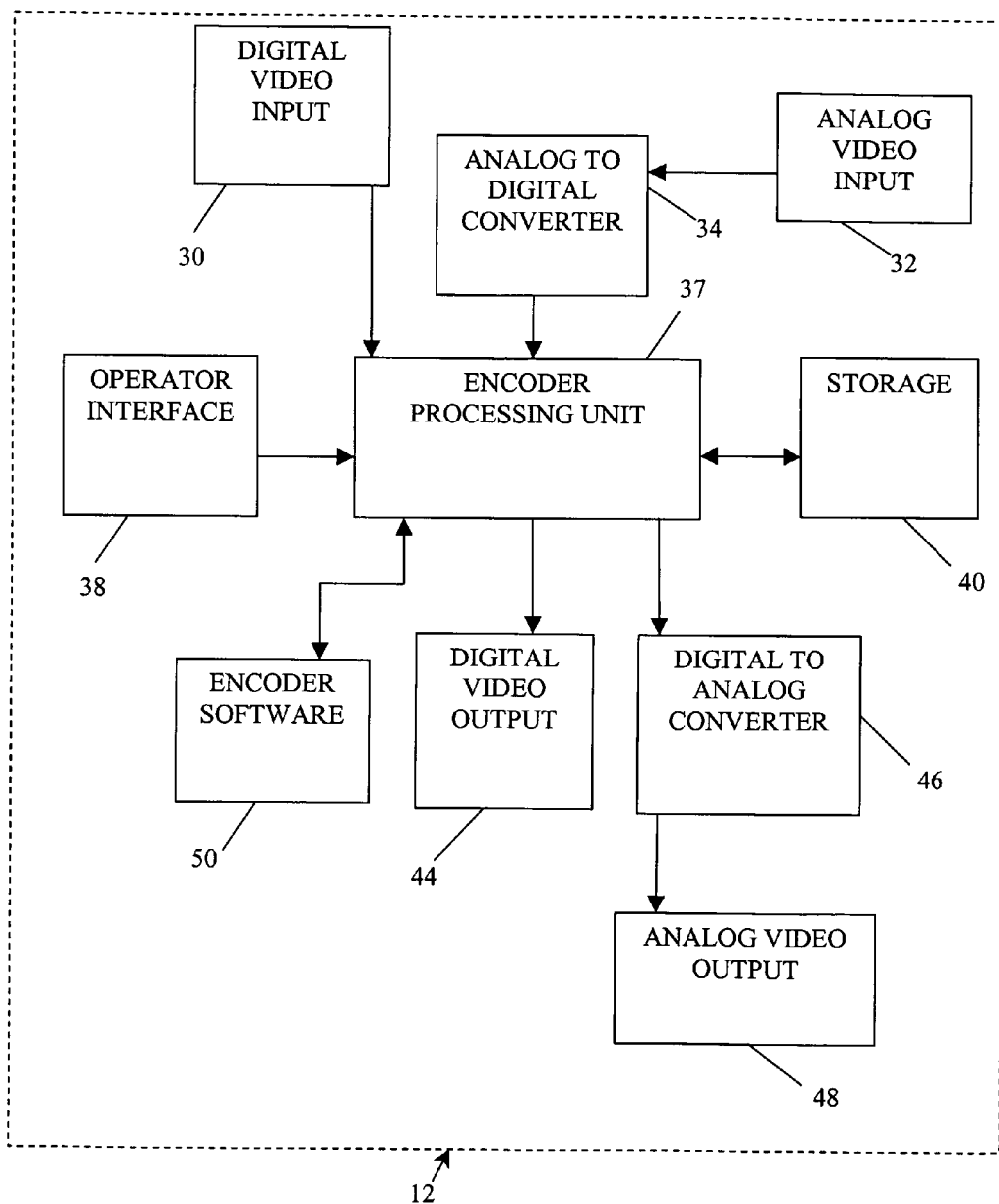
FIG. 3 is a block diagram of an encoder.

Referring to FIG. 3, an implementation of encoder 12 is illustrated. In this implementation, encoder 12 includes an encoder processing unit 37 that directs operation of encoder 12; a digital video input 30, an analog to digital converter 34 and an analog video input 32 to receive content signal 18; a digital video output 44, digital to analog converter 46 and analog video output 48 to output modulated content signal 22; operator interface 38 and encoder software 50 to direct operation of encoder 12; and storage 40 to provide signal storage.

Encoder processing unit 37 alters attributes of content signal 18 to produce modulated content signal 22 containing the auxiliary signal. In general, encoder 12 may be a computer with specialized input/output hardware, but may also be an application specific circuit, programmable hardware, an integrated circuit, an application software unit, or hardware and/or software combination. Encoder processing unit 37 may include a central processing unit (CPU).

Digital video input 30 is in operative association with encoder processing unit 37 and is capable of receiving content signal 18 from signal source 10. However, encoder 12 may also receive an analog content signal 18 through an analog video input 32 and an analog to digital converter 34. Analog to digital converter 34 digitizes the analog content signal 18 according to known techniques such that the digitized content signal 18 may be provided to encoder processing unit 37.

Operator interface 38 is operatively associated with encoder processing unit 37 and may provide encoder processing unit 37 with instructions including where, when and at what magnitude encoder 12 should selectively raise and lower a value such as the luminance (or chrominance) level of content lines of content signal 18 or portions thereof at the direction of operator 16. Instructions are received by operator interface 38 through a serial port or an integrated operator interface (not shown). However other device interconnects of encoder 12 are contemplated including a universal serial bus (USB), "Firewire" protocol (IEEE 1394), and various wireless protocols. In one embodiment, responsibilities of operator 16 and operator interface 38 are partially or wholly integrated with encoder software 50 such that encoder 12 operates in an automated manner.

When encoder processing unit 37 receives operator instructions and content signal 18, it stores the luminance information (and/or chrominance information as desired) of content signal 18 in storage 40. Storage 40 has the capacity to hold and retain signals (e.g., fields of content signal 18 and corresponding audio signals) in a digital form for access by encoder processing unit 37. Storage 40 may be primary storage and/or secondary storage, and may include memory.

After modulation, encoder 12 sends the resulting modulated content signal 22 in a digital format through a digital video output 44, or in an analog format by converting the resulting digital signal with a digital to analog converter 46 and outputting modulated content signal 22 by an analog video output 48. However, encoder 12 need not include both digital video input 30 and digital video output 44 in combination with analog video input 32 and analog video output 48. Rather, a lesser number of the inputs and/or outputs may be included. In addition, other forms of inputting and outputting content signal 18 (and modulated content signal 22) may be interchangeably used, such as when content signal 18 is not in the form of a video signal.

The specific components used by encoder 12 may differ when its technology is included in a pre-existing device as opposed to a stand alone custom device. Encoder 12 may include varying degrees of hardware and software, as various components may interchangeably be used.

Figure 4:
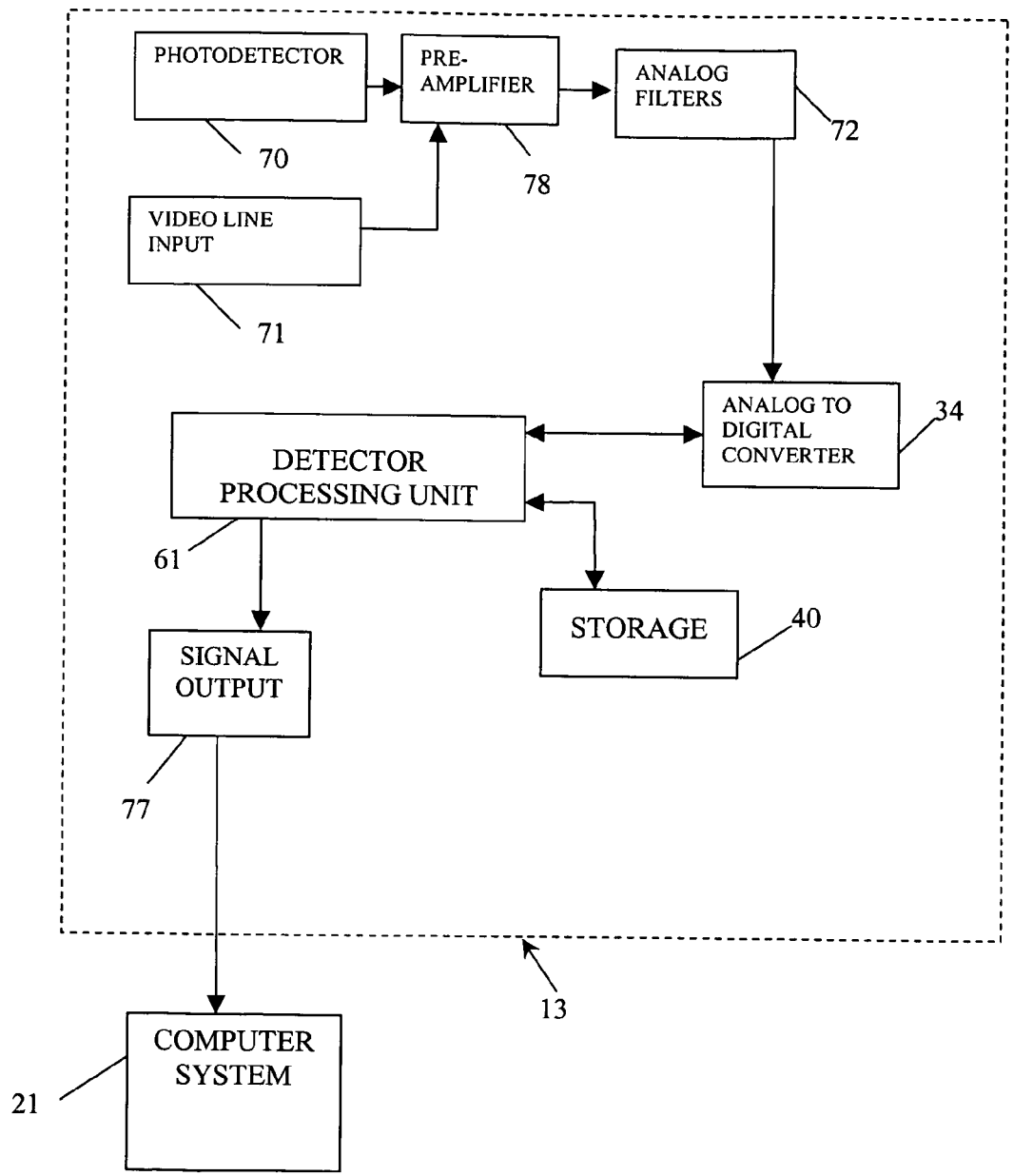
FIG. 4 is a block diagram of a testing detector.

Referring to FIG. 4, an implementation of testing detector 13 is illustrated. In this implementation, testing detector 13 includes a detector processing unit 61 that directs operation of testing detector 13, a photodetector 70 and video line input 71 for receiving content signal 18, preamplifier 78, analog filters 72 and analog to digital converter 34 for processing content signal 18, storage 40 to provide signal storage and a signal output 77 to output a detection of an auxiliary signal to computer system 21.

Detector processing unit 61 may be an application specific circuit, programmable hardware, integrated circuit, application software unit, or hardware and/or software combination. In one embodiment, detector processing unit 61 stores the luminance of test content signal 20 in storage 40 and detects content lines or portions thereof that have increased or decreased luminance level. Detector processing unit 61 processes test content signal 20 to detect the auxiliary signal.

Photodetector 70 is electrically coupled to preamplifier 78 and is capable of optically receiving test content signal 20 from display device 26. Video line input 71 is also electrically coupled to preamplifier 78 and is capable of electrically receiving test content signal 20 from broadcast source 14. In one embodiment where testing detector 13 is optical detector 130, photodetector 70 is included without video line input 71. In another embodiment where testing detector 13 is inline detector 131, video line input 71 is included without photodetector 70.

Pre-amplifier 78 is electrically coupled to analog filters 72, photodetector 70 and video line input 71 and amplifies test content signal 20 by changing the feedback of control gain of feedback circuit. Detector processing unit 61 controls the amount of gain provided to the circuit. Pre-amplifier 78 may be used with testing detector 13 as the distance and intensities received from display device 26 may vary. In one embodiment, when the strength of test content signal 20 is low, testing detector 13 may add gain so that a better reading of test content signal 20 is possible.

Analog filters 72 are electrically coupled to pre-amplifier 78 and analog to digital converter 34 and provide a low pass filter that removes the high frequency elements from test content signal 20 by eliminating all frequencies above a preset level and cleans the signal below a frequency by discarding the undesired signal. In one embodiment, analog filters 72 are set for 7.867 Hertz center frequency so as to filter the video energy captured by means of the photodetector 70 (i.e., so that it will isolate the modulated frequency introduced by encoder 12).

Signal output 77 is electrically coupled to detector processing unit 61 and provides a data output to computer system 21 to indicate whether the auxiliary signal was detected during a particular reading. In one embodiment, the data output is one-bit, however other data outputs are also contemplated.

Storage 40 functions as described above. In one embodiment, detector processing unit 61 stores the luminance of test content signal 20 in storage 40 and detects content lines or portions thereof that have increased or decreased luminance level. One embodiment of the detection scheme is described in greater detail below.

Figure 5:
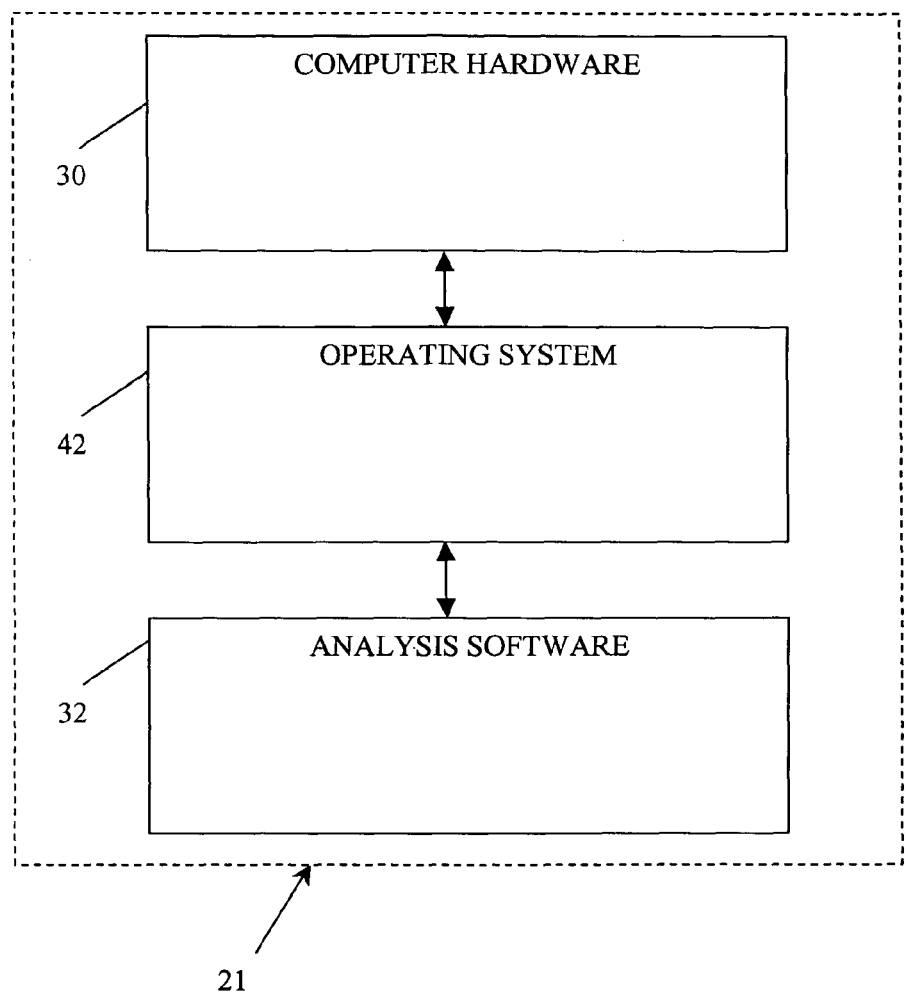
FIG. 5 is a block diagram of a computer system.

Referring to FIG. 5, an implementation of a computer system 21 is illustrated. In this implementation, computer system 21 includes computer hardware 30, operating system 42 and analysis software 32. Analysis software 32 is described in greater detail below.

In one embodiment, computer hardware 30 includes a micro-controller (not shown) that directs the operation of the various components of computer hardware 30, an interface port (not shown) that is electrically coupled to the micro-controller and transmits data to peripheral devices and receives data from the peripheral devices (not shown) to provide to the micro-controller, an input/output interface (not shown) that is electrically connected to the micro-controller and provides interaction with a user (i.e., operator 16) by receiving and providing feedback to and from the user and storage 40 (not shown). Those skilled in the art will appreciate that computer system 21 may be implemented as a general-purpose computer or a specialized device. Other configurations of computer hardware 30 are also contemplated.

Operating system 42 controls the general operation of computer hardware 30. Operating system 42 performs various system calls to control computer hardware 30 on a system level. In one embodiment operating system 42 is Microsoft® Windows XP program, but other operating systems 42 are also contemplated.

Figure 6:
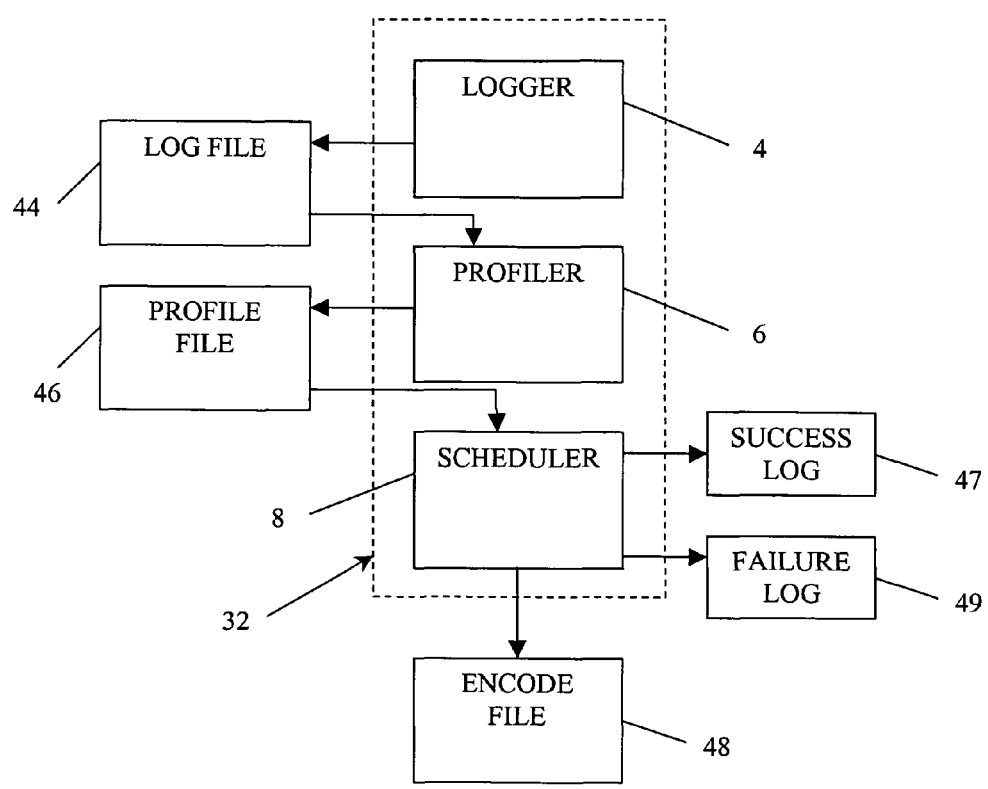
FIG. 6 is a block diagram of an analysis software.

Referring to FIG. 6, an implementation of analysis software 32 is illustrated. In this implementation, analysis software 32 includes a logger 4, a profiler 6 and a scheduler 8. Logger 4 produces log file 44, profiler 6 produces profile file 46, and scheduler 8 produces encode file 48, success log 47 and failure log 49. Logger 6, profiler 6 and scheduler 8 may be software modules operating within operating system 42 (as shown in FIG. 4). An implementation of the operation of analysis software 32 is described in greater detail below.

Figure 7:
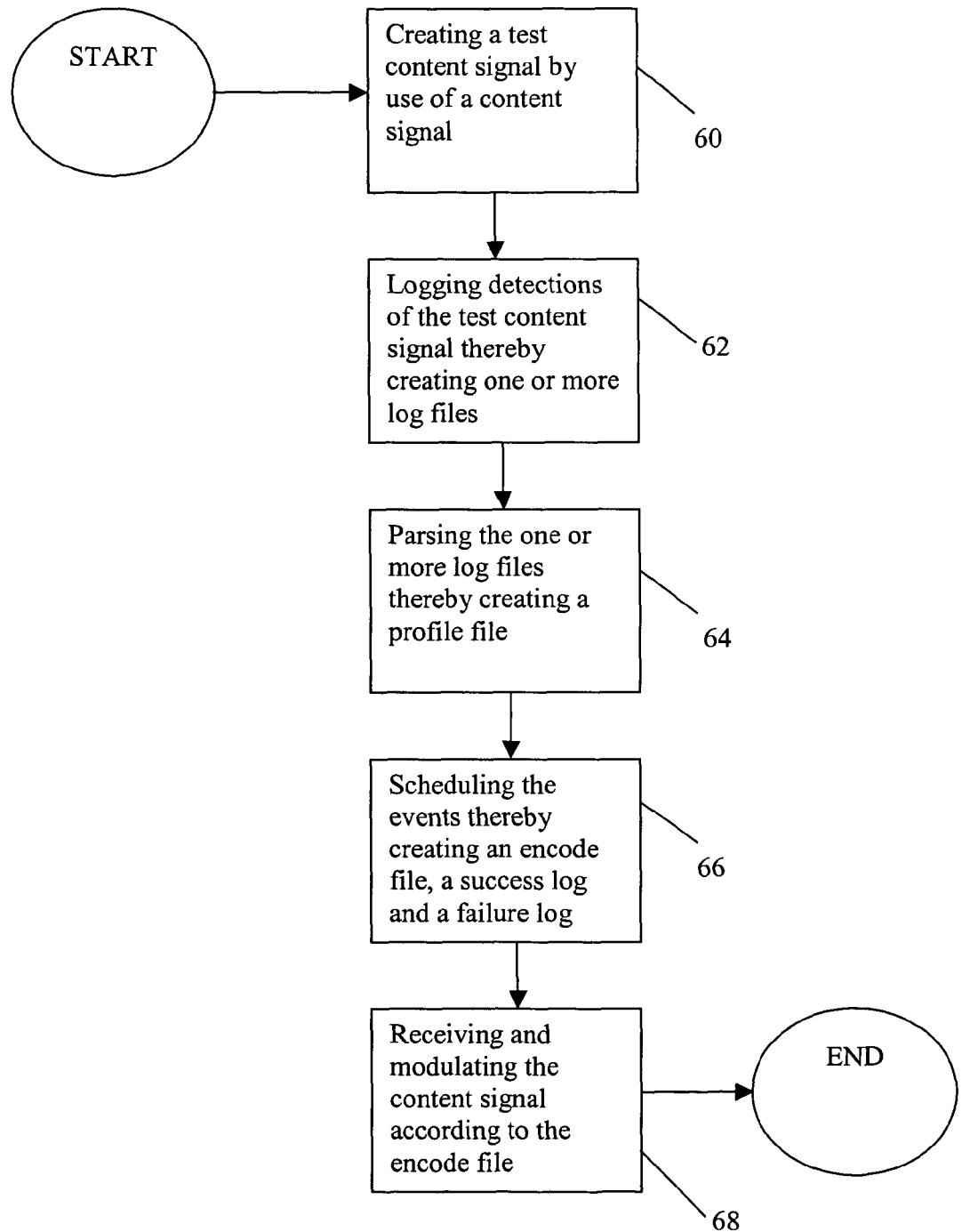
FIG. 7 is a flowchart of a method for modulating a content signal.

Referring to FIG. 7, an implementation of a method of modulating content signal 18 is illustrated. In this implementation, the method includes a step 60 where test content signal 20 is created by use of content signal 18 and provided to broadcast source 14. The generation of test content signal 20 enables analysis software 32 to determine the ability of testing detector 13 to read the auxiliary signal in the form of test data modulated within test content signal 20. Test content signal 20 is provided to testing detector 13 at step 62 and detections of test content signal 20 are provided to analysis software 32 to generate one or more log files 44.

After creation of one or more log files 44, analysis software 32 parses one or more log files 44 at step 64 to create profile file 46, an implementation of which is also described in greater detail below. Profile file 46 indicates locations within test content signal 20 where readings of the auxiliary signal by testing detector 13 were successful.

Thereafter, analysis software 32 schedules profile file 46 to create encode file 48, success log 47 and failure log 49 at step 66. Encoder file 48 indicates a scheme for modulating content signal 18 to contain desired data. Finally, encoder 12 utilizes encode file 48 to modulate content signal 18 thereby creating modulated content signal 22 at step 68.

Figure 8:
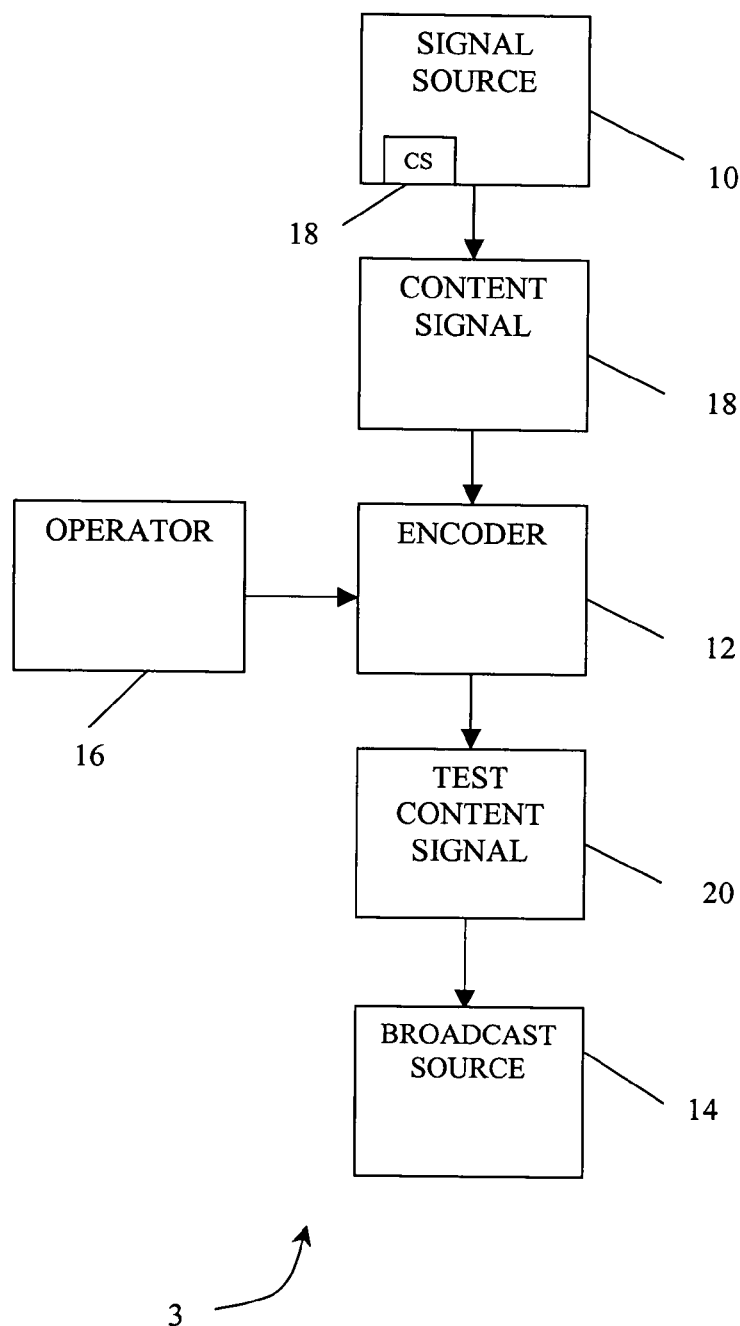
FIG. 8 is a block diagram of a test system.

Referring to FIG. 8, an implementation of a test system 3 is illustrated. In this implementation, a signal source 10 provides content signal 18 to encoder 12. As described in greater detail below, operator 16 directs encoder 12 to receive and modulate content signal 18 with test data thereby creating test content signal 20. Test content signal 20 is then provided to broadcast source 14. An implementation using test system 3 is described in greater detail below.

Figure 9:
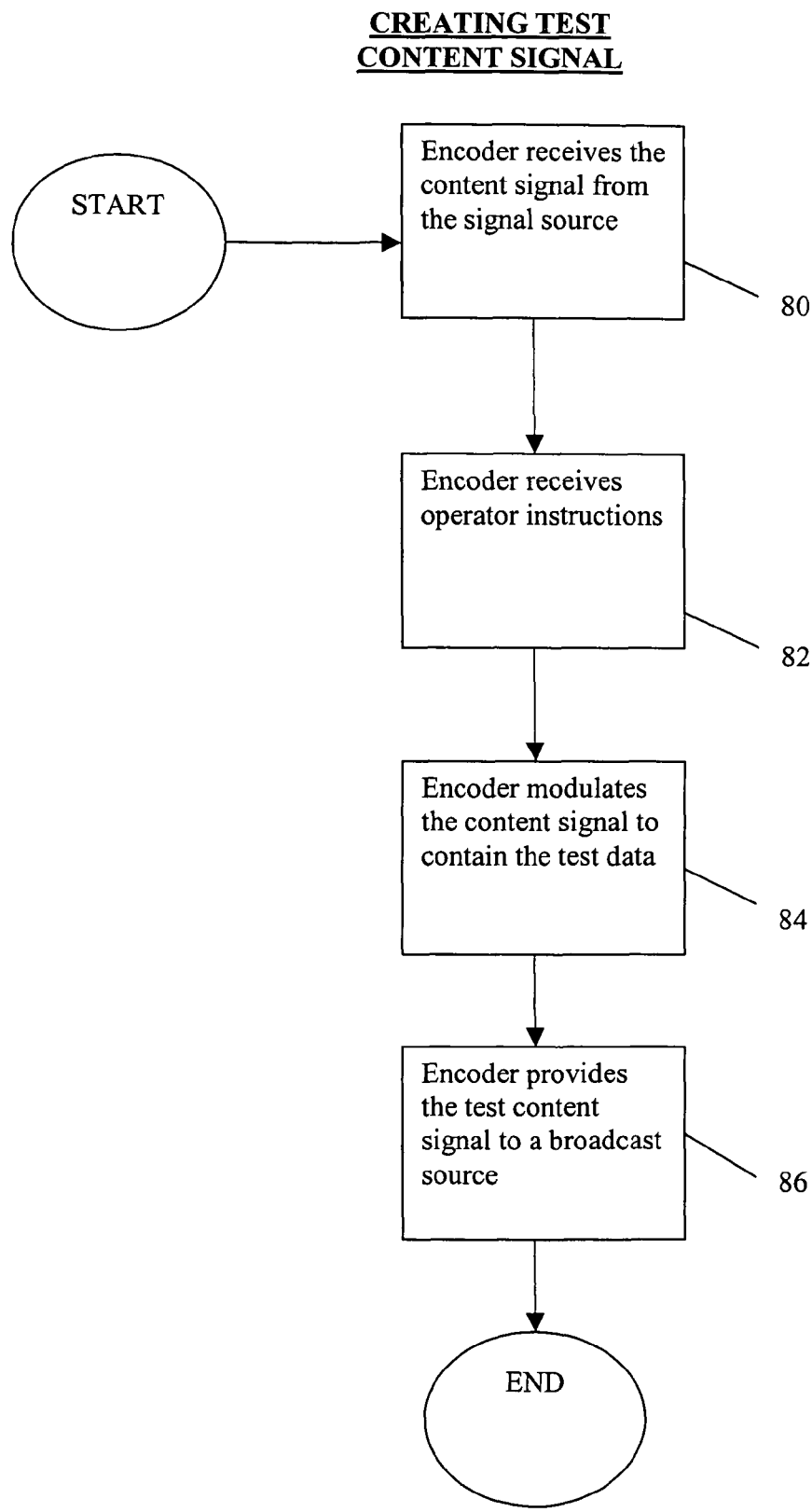
FIG. 9 is a flowchart of a method for creating a test content signal.

Referring to FIG. 9, an implementation for a method of creating test content signal 20 by use of content signal 18 is illustrated. In this implementation, the method includes a step 80 where encoder 12 receives content signal 18 from signal source 10. Thereafter, encoder 12 at step 82 receives operator instructions from operator 16 to modulate content signal 18 to contain test data.

In one embodiment, the test data is a string of known test data with a pattern that does not have portions that repeat itself so that testing detector 13 will not confuse a first portion of the test data with a second portion. In one embodiment, the same known test data is used each time a test content signal 20 is created for a particular content program. In another embodiment operator 16 may define a different known test data to be used in the creation of a particular test content signal 20. Other implementations of test data are also contemplated.

Encoder 12 at step 84 modulates content signal 18 to contain the test data. In one embodiment, encoder 12 at step 84 modulates the test data repeatedly throughout an entire content program by selectively modulating a segment (e.g., fields or frames) of content signal 18. In one embodiment, the modulation method is described in Broughton, however other modulation methods are also contemplated.

Encoder 12 at step 86 provides test content signal 20 to broadcast source 14. In one embodiment, the resulting test content signal 20 is stored on broadcast source 14. Thereafter, one implementation of a method for creating test content signal 20 by use of content signal 18 is complete.

Figure 10:
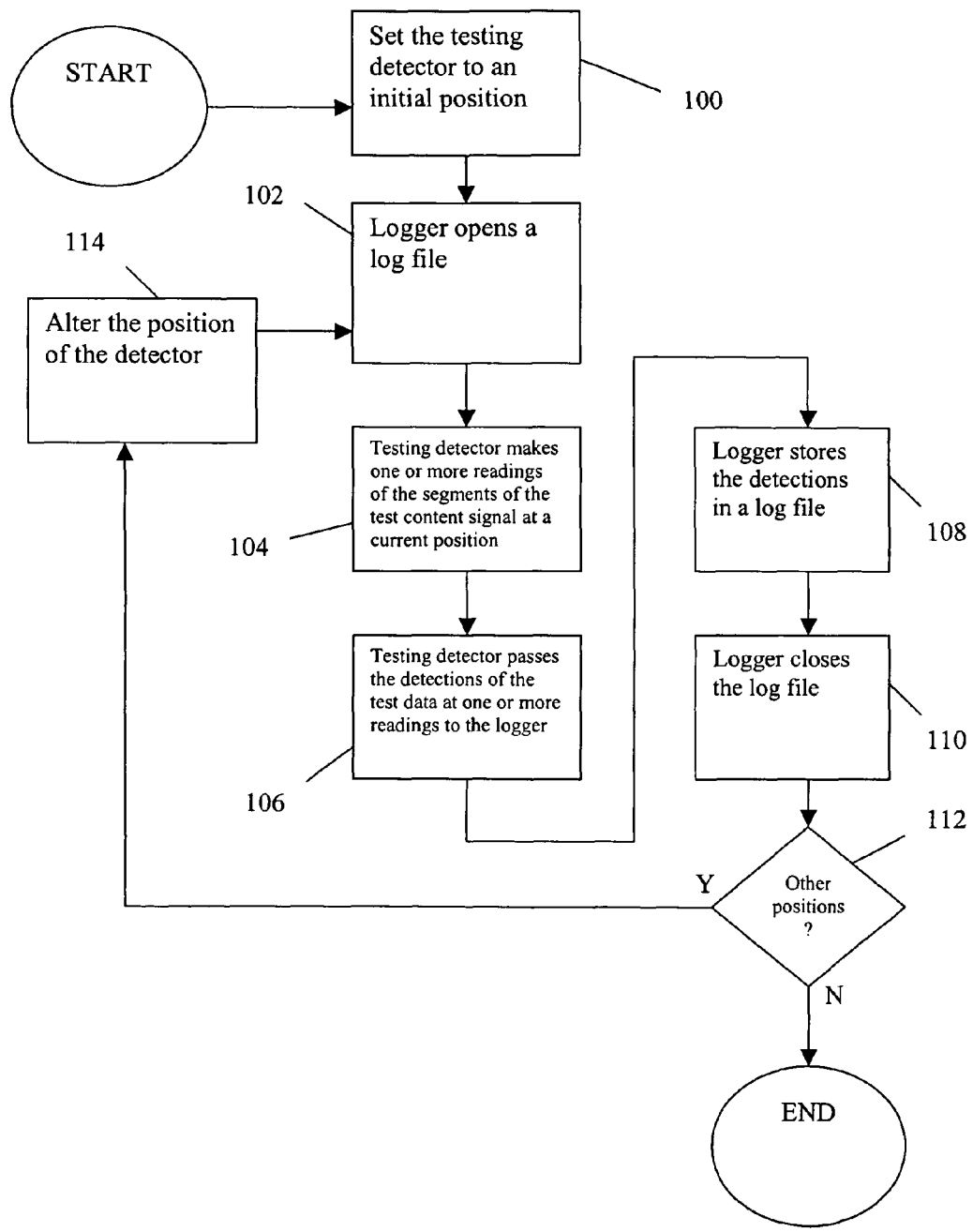
FIG. 10 is a flowchart of a method for logging detections of the test content signal.

Referring to FIG. 10, an implementation of a method of logging detections of test content signal 20 is illustrated. In this implementation, operator 16 at a step 100 sets testing detector 13 to an initial position relative to test device 9, such that the initial position is the first current position.

In one embodiment, testing detector 13 is first set to an initial position at a near distance from display device 26 that visually presents test content signal 20 and then set to a far distance from display device 26, where each distance when selected is considered the current position and testing detector 13 is oriented to visually detect test content signal 20 from display device 26. In one embodiment, the near distance is about four feet and the far distance is about eight feet, however other distances are also contemplated.

In one embodiment, any number of positions (e.g., different distances between testing detector 13 and display device 26) may be used during the logging method depending on the desired application. In one embodiment, other variances (all of which may be referred to as "positions") instead of or in addition to multiple detector positioning may be used such as using different testing detectors 13 and modulation methods and varying encode signal strength. Other variances are also contemplated.

Logger 4 at step 102 opens a log file 44 to store the detections that logger 4 receives from testing detector 13. In one embodiment, a separate log file 44 is associated with each position.

Testing detector 13 at step 104 makes one or more readings of each segment of test content signal 20 at the current position, where a criteria is used to identify whether the reading was identified as having a signal presence or signal absence. In one embodiment, the segment is a field of test content signal 20, while in another embodiment, the segment is a frame of test content signal 20. Testing detector 13 at step 106 then passes the detections to logger 4 through computer system 21.

In one embodiment, testing detector 13 passes to computer system 21 a data bit of one for each of the one or more readings that testing detector 13 determines where modulation is present and a data bit of zero for each reading where it fails to detect modulation. In one embodiment the number of readings is eight, however other number of readings are also contemplated.

Logger 4 stores the detections in log file 44 at step 108. In one embodiment, the detections are stored sequentially in log file 44. After all of the detections have been stored, logger 4 at step 110 closes log file 44.

Operator 16 at decision point 112 determines whether testing detector 13 will be at another position for additional readings. If yes, operator 16 at step 114 alters the position of testing detector 13 thereby making a new current position and thereafter returns to step 102. If no other reading is to be taken, one implementation of the foregoing method is complete.

Referring to FIG. 11A, an exemplary embodiment of a profile file 300 at a first position is illustrated. In this exemplary embodiment, profile file 300 includes five profile sections 302-312. Profile file 300 is marked at profile sections 304 and 306 for an unsuccessful reading and marked at profile sections 302 and 308-312 with success data for a successful reading at a first position. Other number of profile sections based on the number of segments of test content signal 20 and indicia used to mark profile file 300 are contemplated.

Referring to FIG. 11B, an exemplary embodiment of a profile file 300 at a second position is illustrated. In this exemplary embodiment, profile file 300 includes five profile sections 314-324. Profile file 300 is marked at profile sections 314 and 316 for an unsuccessful reading and marked at profile sections 318-322 with success data for a successful reading at a second position.

Referring to FIG. 11C, an exemplary embodiment of a profile file 300 at a first position and a second position is illustrated. In this exemplary embodiment, profile file 300 includes five profile sections 326-336. Profile file 300 is marked at profile sections 328 for an unsuccessful reading, marked at profile sections 326 and 336 with success data for a successful reading at a first position, marked at profile sections 330 with success data for a successful reading at a second position, and marked at profile sections 332 and 334 with success data for a successful reading at the first position and the second position.

Referring to FIG. 12, an implementation of a method of parsing the one or more log files 44 is illustrated. In this implementation, the method includes a step 120 where profiler 6 initializes a series of registers to all zeros. In one embodiment, the number of registers utilized during a parsing method directly corresponds to the number of readings of a particular segment (e.g., a field or a frame) of test content signal 20. In one embodiment, the bit-length of the registers are equal to the bit length of the test data. Thereafter, profiler 6 at step 122 initializes a register pointer to the first register.

Profiler 6 initializes a success criteria flag to false at step 124. In one embodiment, the success criteria flag is utilized to determine if two consecutive readings (e.g., on portions of the fields) of test content signal 20 where the modulated test data was read properly. While the number of consecutive readings in one embodiment is two indicating that readings from 25% of display device 26 were correct, more or less readings are also contemplated. The particular success criteria used may vary based on need including whether a particular embodiment is critical and on a particular application and/or customer.

At step 126, profiler 6 initializes a bit pointer to the first data bit in a log file. Profiler 6 at step 128 reads the data bit from the log file at the bit pointed to by the bit pointer (i.e., the "current bit") and shifts that data bit into the register currently pointed to by the register pointer ("the current register"). Thereafter, profiler 6 at decision point 130 determines whether the test data of the current register matches the known test data that was previously modulated into test content signal 20. If no, profiler 6 sets the success criteria flag to false at step 132 and records failure data in profile file 46 at step 134. If the test data of the current register matches the known test data, profiler 6 proceeds to decision point 136.

Profiler 6 at decision point 136 determines whether the success criteria flag is true (thereby indicating to profiler 6 that the result of the previous comparison at step 130 was yes). If the success criteria flag is not true, profiler 6 at step 140 sets the success criteria flag to true and records failure data in profile file 46 at step 134. If the success criteria flag is true, profiler 6 at step 138 records success data in profile file 46.

In one embodiment, profile file 46 is set to a default of failure data and so only success data need be marked in profile file 46.

After step 134 or step 138, profiler 6 at decision point 142 determines whether the current register is the last in the series of registers. If the current register is not the last, profiler 6 at step 144 advances the register pointer to the next register in the series. If the current register is the last, profiler 6 at step 146 sets the register pointer back to the first register. By the foregoing pointer adjustment, each successive reading of each segment of test content signal 20 is placed in corresponding successive registers, such that a reading position in a segment has a one to one correspondence with a particular register. Other implementations of the foregoing method are also contemplated.

Profiler 6 at decision point 147 determines whether the bit pointer is currently pointing to the last bit of log file 44 (i.e., at the end of log file 44). If no, it proceeds to advance the bit pointer to the next bit in log file 44 at step 148 and returns to step 128.

If the bit pointer is currently pointing to the last bit, profiler 6 determines at decision point 149 whether there is another log file 44. If yes, profiler 6 proceeds to step 120 with a new log file 44. If there is not another log file, one implementation of a profiling method is complete.

In one embodiment, if only one reading was made then the foregoing profiling method may be modified so as to only require a single register and no success criteria flag.

In one embodiment, the foregoing method may be modified to require more than two consecutive successful readings in order to record success data, and such number may be dependent on the total number of readings per segment and the demands of a particular embodiment.

In one embodiment, one profile file 46 is used to record success data and failure data for the one or more positions. In another embodiment, a profile file 46 is created for each of the one or more positions, and the multiple profile files 46 are merged into a signal profile file 46 when read into scheduler 8.

Other methods of determining suitable locations to modulate content signal 18 with the auxiliary signal are also contemplated.

Referring to FIG. 13, an implementation of a method for marking success data is illustrated. In this implementation, the method first includes a decision point 170 where profiler 6 determines whether it will mark data for the first position. If yes, profiler 6 at step 172 records a data bit of one for bit 156 for the position bytes of a current profile section of profile file 46. If profiler determines that it will not mark data for the first position, profiler 6 at step 174 records a data bit of one for bit 158 for the position bytes of a current profile section of profile file 46. Upon completion of the recording of the one or more data bits of one at step 174 or step 176, one implementation of a method for marking success data is complete.

In one embodiment, the foregoing method for marking successful data for a first position and a second position may be modified when there are more than positions.

Figure 14:
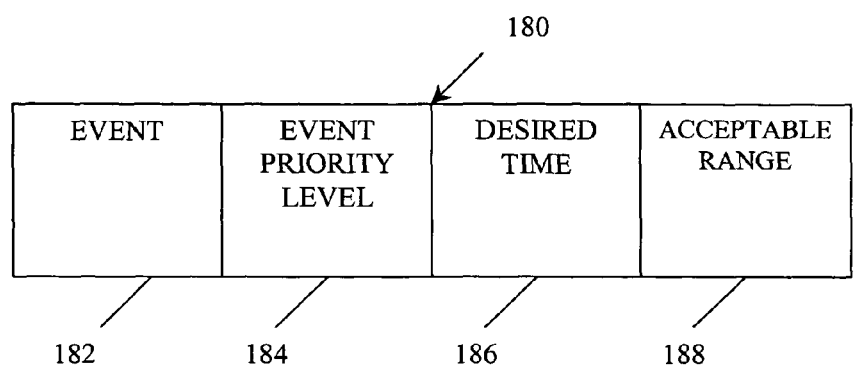
FIG. 14 is a block diagram of event data.

Referring to FIG. 14, an implementation of event data 180 is illustrated. In this implementation, event data 180 is shown to first comprise an event 182. In one embodiment, event 182 identifies the action that is to take place on a detector or to a device electrically connected to the detector at an indicated time. In one embodiment, event 182 is a code corresponding to a listed action. As described in one implementation below, event data 180 may be created by operator 16 during scheduling and provides for event 182 and its timing for modulation within content signal 18.

The specific types of action defined by event 182 may depend on a particular implementation, and may include by way of example triggered sounds, lights and/or motion, unlocked features, promotional codes and coupons. Other types of action are also contemplated.

Event data 180 includes an event priority level 184, which defines the relative importance of modulating a particular modulation of event 182 within content signal 18 as opposed to another modulation of a same or different modulation of event 182 within content signal 18. In one embodiment, event priority level 184 may reflect: (1) the impact of a particular event 182, (2) the range of content with which to work (e.g., how close the modulation of event 182 should be relative to the time in which the action defined by event 182 is to occur, and (3) the number of times to modulate each event 182 within content signal 18, where subsequent modulations may have a lower event priority level 184.

Event data 180 further includes desired time 186. In one embodiment, desired time 186 indicates the time at which operator 16 would like event 182 to occur (e.g., such as on a detector) relative to the presentation of content signal 18. In one embodiment, desired time 186 is absolute time while in another embodiment desired time 186 is relative time.

Event data 180 includes an acceptable range 188. In one embodiment, acceptable range 188 defines how many seconds before desired time 186 event 182 may be scheduled to occur on or through the detector, while in another embodiment, acceptable range 188 defines how many bits before desired time 186 event 182 may be scheduled to occur.

Figure 15:
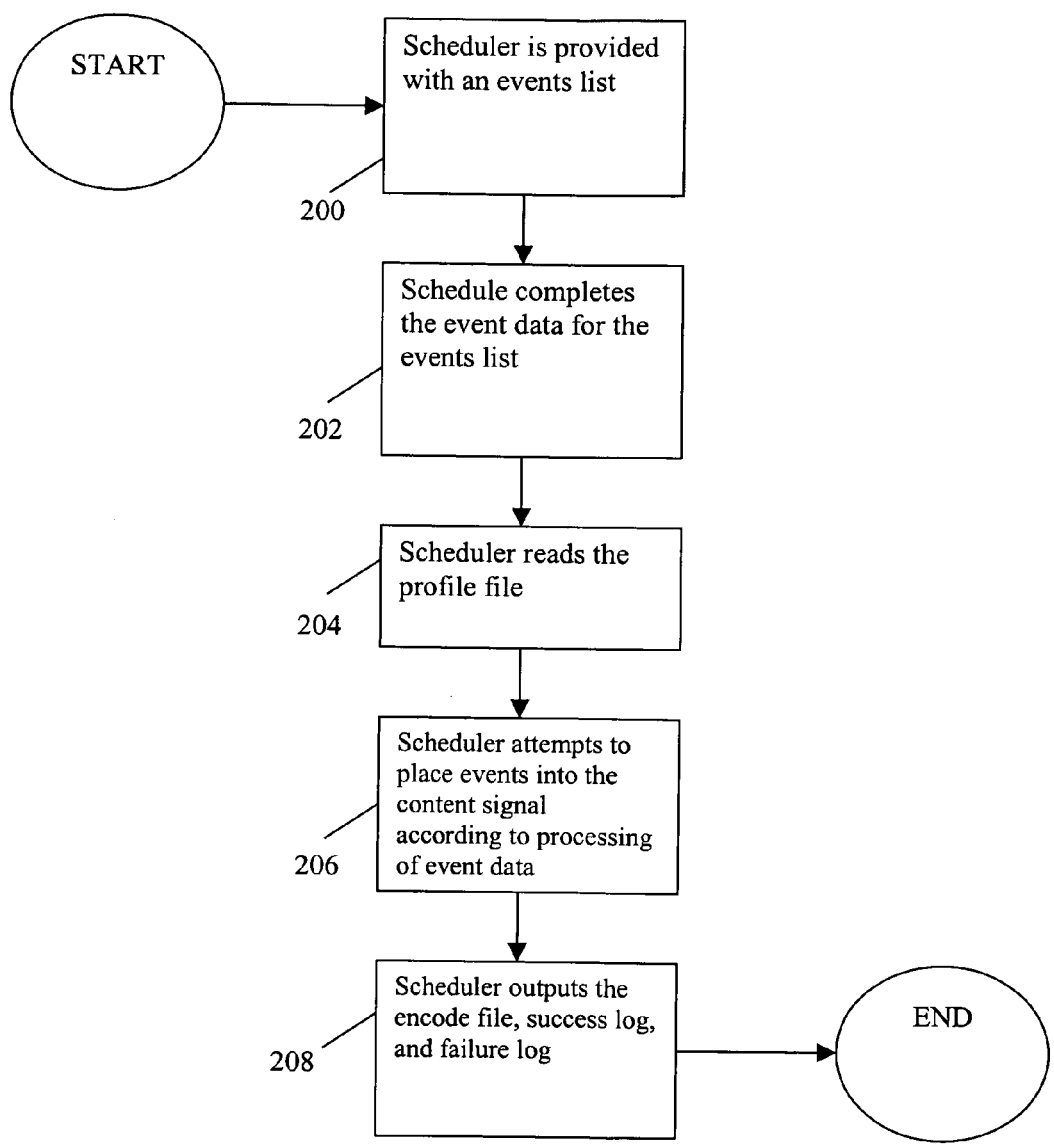
FIG. 15 is a flowchart of a method for scheduling the modulation of events.

Referring to FIG. 15, an implementation of a method for scheduling the modulation of events 182 within content signal 18 is illustrated. In this implementation, the method first comprises a step 200 where scheduler 8 is provided with a listing of events 182 ("events list"). In one embodiment, operator 16 provides scheduler 8 with the events list by identifying particular events 182 and desired times 186. In one embodiment, operator 16 further identifies event priority level 184 and/or acceptable range 188 for particular events 182.

Scheduler 8 at step 202 completes event data 180 for the events list. In one embodiment, scheduler 8 accesses a configuration file to obtain event priority level 184 and acceptable range 188 for events 182 listed in the events list. In one embodiment, the configuration file is a database, but other embodiments are also contemplated.

Scheduler 8 at step 204 reads profile file 46 to determine suitable locations for modulating content signal 18, one embodiment of which is described above. In one embodiment where there is more than one profile file 46, schedule 8 merges the multiple profile files 46 into a single profile file 46.

Thereafter, scheduler 8 at step 206 attempts to place a particular modulation of event 182 into content signal 18 according to event priority level 184 as described in greater detail below. In one embodiment, each event 182 during this step is placed multiple times, an implementation of which is described in greater detail below.

Scheduler 8 then outputs encode file 48, success log 47 and failure log 49 at step 208. Thereafter, an implementation of the foregoing method is complete.

Figure 16:
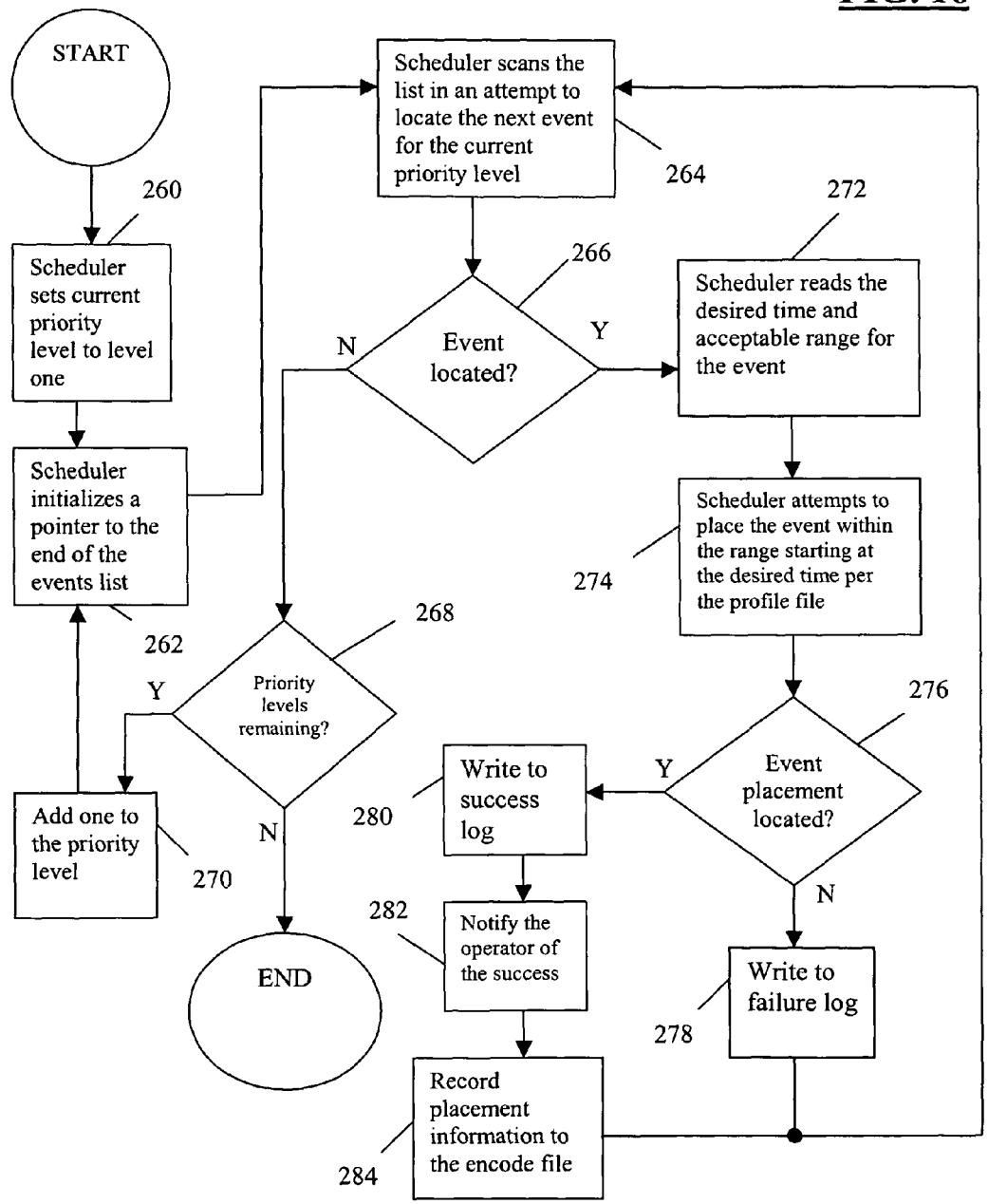
FIG. 16 is a flowchart of a method for scheduling events.

Referring to FIG. 16, an implementation of a method for scheduling events 182 is illustrated. In this implementation, the method first includes a step 260 where scheduler 8 sets the current priority level to the highest level, which in one embodiment is priority level of one. Thereafter, scheduler 8 at step 262 initializes a pointer to the end of the listing of events 182 (i.e., the "events list").

Scheduler 8 at step 264 scans the events list in an attempt to locate the next event data 180 for the current priority level. Thereafter, scheduler 8 determines at decision point 266 whether corresponding event data 180 was located for the current priority level.

If scheduler 8 located event data 180 for the current priority level at decision point 266, scheduler 8 proceeds at step 272 to read desired time 186 and acceptable range 188 for event 182. Scheduler 8 then at step 274 attempts to locate a suitable location in content signal 18 per profile file 46 to place event 182 as near as possible to desired time 186 and searching back in content signal 18 until the end of acceptable range 188.

Scheduler 8 at decision point 276 determines whether a suitable location was identified for event 182. If no suitable location was identified, scheduler 8 writes to failure log 49 at step 278 and returns to step 264. If a suitable location was identified, scheduler 8 writes to the success log 48 at step 280, notifies operator 16 of the success at step 282, and records placement information to encode file 48 at step 284. In addition, scheduler 8 marks profile file 46 to indicate that the just utilized profile sections are no longer available for other events 182. Upon completion of step 284, scheduler 8 returns to step 264 in an attempt to place a next event 182.

In one embodiment, placement information is a data packet recorded in encode file 48. In one embodiment, the data packet is a 32 bit data packet that includes bits for header, code for event 182, duration of event 182, delay for event 182 and checksum.

If no event data 180 was located at decision point 266, scheduler 8 proceeds to decision point 268 to determine whether there are any additional priority levels. If yes, scheduler 8 at step 270 proceeds to a lower priority level (e.g., by adding one to the priority level) and returns to step 262. If there after no additional priority levels, one implementation of the foregoing method is complete.

In one embodiment, the foregoing method determines where to modulate data strings containing events 182 and corresponding delays in presenting events 182 to the user. In one embodiment, the events list is sorted by priority and then handled sequentially.

It should be understood from the foregoing that, while particular implementations have been illustrated and described, various modifications can be made thereto and are contemplated herein. Therefore, it is not intended that the invention be limited by the specific examples provided within the specification.

What is claimed is:

1. A method comprising:

marking a first plurality of configuration readings of a test content signal on a first processor based on a first detection configuration, the test content signal being a content signal with a plurality of modulated content frames, a particular first configuration reading of the first plurality of configuration readings being of a particular modulated content frame of the plurality of modulated content frames, the particular modulated content frame having test data;

marking a second plurality of configuration readings of the test content signal on the first processor based on the first detection configuration, the second plurality of configuration readings corresponding to the first plurality of configuration readings, a particular second configuration reading of the second plurality of configuration readings being of the particular modulated content frame;

marking a first plurality of additional configuration readings of the test content signal on the first processor based on a second detection configuration, the second detection configuration being a variance of the first detection configuration, a particular first additional configuration reading of the first plurality of additional configuration readings being of the particular modulated content frame;

marking a second plurality of additional configuration readings of the test content signal on the first processor based on the second detection configuration, a particular second additional configuration reading of the second plurality of additional configuration readings being of the particular modulated content frame;

storing profile data based on the marking of the first plurality of configuration readings, the second plurality of configuration readings, the first plurality of additional configuration readings, and the second plurality of additional configuration readings, the profile data including a plurality of profile entries, a particular profile entry of the plurality of profile entries corresponding to the particular modulated content frame, the particular profile entry being marked to indicate a successful first configuration reading for the first detection configuration when the first particular configuration reading and the second particular configuration reading match the test data, the particular profile entry being marked to indicate a successful second configuration reading for the second detection configuration when the first particular additional configuration reading and the second particular additional configuration reading match the test data, and the particular profile entry being marked to indicate the successful first configuration reading and the second successful additional configuration reading when the first particular configuration reading, the second particular configuration reading, the first particular additional configuration reading, and the second particular additional configuration reading match the test data;

accessing event data for a plurality of events, the event data for a particular event including identification of a particular action, a particular event priority defining importance of the action relative to a remaining portion of a plurality of actions, a desired time of occurrence for performance of the particular action, and a particular acceptance range defining how long before the desired time the particular event can be encoded;

determining placement for at least a portion of the plurality of events in the content signal based on the event data and the profile data; and modulating the plurality of frames of the content signal in accordance with determination of placement and a modulation technique.

2. The method of claim 1, further comprising:

receiving the content signal from a signal source;

receiving an operator instruction to modulate the content signal with the test data; and modulating the content sign with the test data based on receipt of the operator instruction.

3. The method of claim 1, wherein the modulation technique includes a video modulation technique.

4. The method of claim 3, wherein the modulation technique includes a luminance modulation technique.

5. The method of claim 1, wherein the modulation technique includes an audio modulation technique.

6. The method of claim 1, wherein the content signal is a standard definition (SD) video signal.

7. The method of claim 1, wherein the content signal is a high definition (HD) video signal.

8. The method of claim 1, wherein the content signal is NTSC (National Television Standards Committee) video signal, PAL (Phase Alternation Line) video signal, SECAM (Systeme Electronique Couleur Avec Memoire) video signal, or sequence of bitmaps signal.

9. A method of claim 1, wherein determining the placement comprises:

determining the placement for a first event of the plurality of events based on the profile data;

selecting the particular event for placement based on relative priority, the first event of the plurality of events having a higher priority than the particular event; and determining placement for the particular event based on the profile data.

10. The method of claim 9, wherein determining the placement for the particular event comprises:

identifying a first frame of the content signal as a first candidate frame for modulation of the particular event based on the profile data and the desired time of occurrence for performance of the particular action;

determining that the first frame is unavailable for modulation;

selecting a prior frame of the content signal as a second candidate frame for modulation of the particular event based on the profile data, the desired time of occurrence for performance of the particular action, and a determination that the first frame is unavailable for modulation, the prior frame being in accordance with the particular acceptance range; and determining that the prior frame is available for modulation;

wherein modulation of the plurality of frames of the content signal includes modulation of the prior frame in accordance with determination of that the prior frame is available for modulation and the modulation technique.

11. The method of claim 10, further comprising:

recording successful placement indicia in a success log based on recording the placement.

12. The method of claim 9, wherein determining the placement further comprises:

recording the placement in an encode file, wherein modulating the plurality of frames of the content signal is in accordance with the encode file and the modulation technique.

13. The method of claim 1, wherein the first detection configuration is based on a detector associated with the first processor being at a first distance and the second detection configuration is based on the detector associated with the first processor being at a second distance, the second distance being at a different distance than the first distance.

14. The method of claim 1, wherein the first detection configuration is based on a first detector associated with the first processor and the second detection configuration is based on the detector associated with a second detector associated with the first processor, the second detector being a different detector than the first detector.

15. The method of claim 14, wherein the signal absence represents a data bit of zero and the signal presence represents a data bit of one.

16. The method of claim 14, wherein the signal absence represents complementary data bits "zero one" and the signal presence represents complementary data bits "one zero".

17. The method of claim 1, further comprising:
selecting a first modulation technique associated with the test content signal, a second modulation technique associated with the test content signal, or both as the modulation technique based on the profile data,
wherein the first detection configuration is based on the first modulation technique and the second detection configuration is based on the second modulation technique associated with the test content signal, the second modulation technique being a different technique than the first modulation technique, and
wherein modulating the plurality of frames of the content signal is in accordance with determination of placement and selection of the modulation technique.

18. The method of claim 1, wherein a particular frame of the plurality of frames is modulated with a signal absence or a signal presence.

19. A nontransitory machine readable medium comprising instructions, which when executed by one or more processors, cause the one or more processors to perform the following operations:
mark a first plurality of configuration readings of a test content signal on a first processor based on a first detection configuration, the test content signal being a content signal with a plurality of modulated content frames, a particular first configuration reading of the first plurality of configuration readings being of a particular modulated content frame of the plurality of modulated content frames, the particular modulated content frame having test data;
mark a second plurality of configuration readings of the test content signal on the first processor based on the first detection configuration, the second plurality of configuration readings corresponding to the first plurality of configuration readings, a particular second configuration reading of the second plurality of configuration readings being of the particular modulated content frame;
mark a first plurality of additional configuration readings of the test content signal on the first processor based on a second detection configuration, the second detection configuration being a variance of the first detection configuration, a particular first additional configuration reading of the first plurality of additional configuration readings being of the particular modulated content frame;
mark a second plurality of additional configuration readings of the test content signal on the first processor based on the second detection configuration, a particular second additional configuration reading of the second plurality of additional configuration readings being of the particular modulated content frame;
storing profile data based on the marking of the first plurality of configuration readings, the second plurality of configuration readings, the first plurality of additional configuration readings, and the second plurality of additional configuration readings, the profile data including a plurality of profile entries, a particular profile entry of the plurality of profile entries corresponding to the particular modulated content frame, the particular profile entry being marked to indicate a successful first configuration reading for the first detection configuration when the first particular configuration reading and the second particular configuration reading match the test data, the particular profile entry being marked to indicate a successful second configuration reading for the second detection configuration when the first particular additional configuration reading and the second particular additional configuration reading match the test data, and the particular profile entry being marked to indicate the successful first configuration reading and the second successful additional configuration reading when the first particular configuration reading, the second particular configuration reading, the first particular additional configuration reading, and the second particular additional configuration reading match the test data;
access event data for a plurality of events, the event data for a particular event including identification of a particular action, a particular event priority defining importance of the action relative to a remaining portion of a plurality of actions, a desired time of occurrence for performance of the particular action, and a particular acceptance range defining how long before the desired time the particular event can be encoded;
determine placement for at least a portion of the plurality of events in the content signal based on the event data and the profile data; and
modulate the plurality of frames of the content signal in accordance with determination of placement and a modulation technique.

* * * * *